United States Patent
Westerman

(10) Patent No.: US 6,683,986 B1
(45) Date of Patent: Jan. 27, 2004

(54) EFFICIENT TRANSMISSION OF QUARTER-VGA IMAGES USING DVC CODECS

(75) Inventor: Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/429,229

(22) Filed: Oct. 28, 1999

(51) Int. Cl.[7] .................................................. G06K 9/36
(52) U.S. Cl. .................. 382/232; 382/236; 358/426.09; 375/240.23; 348/415.1
(58) Field of Search ................................ 382/232, 236; 358/426.09; 375/240.263; 703/2; 348/415.1, 407.1, 413.1, 416.1, 699

(56) References Cited

U.S. PATENT DOCUMENTS 4,774,587 A * 9/1988 Schmitt ................. 358/426.09
4,918,523 A * 4/1990 Simon et al. ........... 375/240.23
6,289,297 B1 * 9/2001 Bahl .............................. 703/2
6,295,376 B1 * 9/2001 Nakaya ....................... 382/236

FOREIGN PATENT DOCUMENTS

EP          0822724 A2     2/1998     .......... H04N/9/804

* cited by examiner

Primary Examiner—Anh Hong Do
(74) Attorney, Agent, or Firm—Marger Johnson & McCollom, PC

(57) ABSTRACT

Methods and apparatus for encoding and decoding video subframes (e.g., lower-resolution video) with a DVC video coder are disclosed. The disclosed embodiments allow a DVC video coder to efficiently code a subframe. The disclosed encoder embodiments redistribute blocks of data from a subframe to correspond with the staggered locations used for video segment creation. This separates video segments at the DVC coder output into two groups—those largely or completely composed of subframe data, and those containing discardable data. The present invention allows a DVC coder to be used efficiently for several different video resolutions, or in a low-resolution system.

4 Claims, 15 Drawing Sheets

| Frame Time | T0 | T1 | T2 | T3 | T4 | T5 |
|---|---|---|---|---|---|---|
| Buffer A | Store F(0) | Read F(0) | Read F(0) | Store F(3) | Read F(3) | Read F(3) |
| Buffer B | Null | Store F(1) | Read F(1) | Read F(1) | Store F(4) | Read F(4) |
| Buffer C | Null | Read Null | Store F(2) | Read F(2) | Read F(2) | Store F(5) |
| Mixed Image | Null | F(0) and Null | F(0) and F(1) | F(2) and F(1) | F(2) and F(3) | F(4) and F(3) |
| Encoded Image | Null | Null | F(0) and Null or F(1) | F(0) or F(2) and F(1) | F(2) and F(1) or F(3) | F(2) or F(4) and F(3) |
| Selected Image | Null | Null | F(0) | F(1) | F(2) | F(1) |

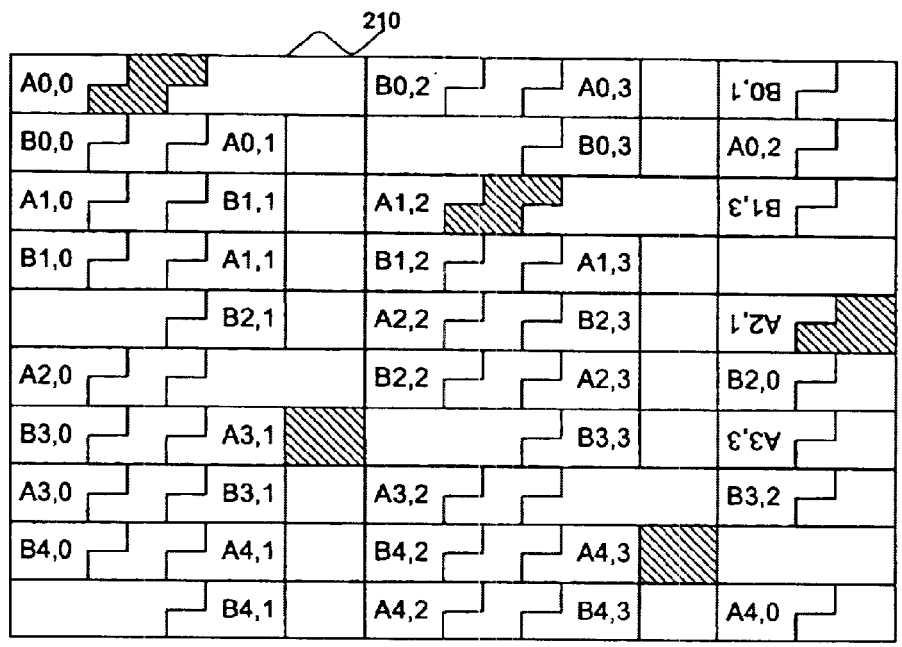
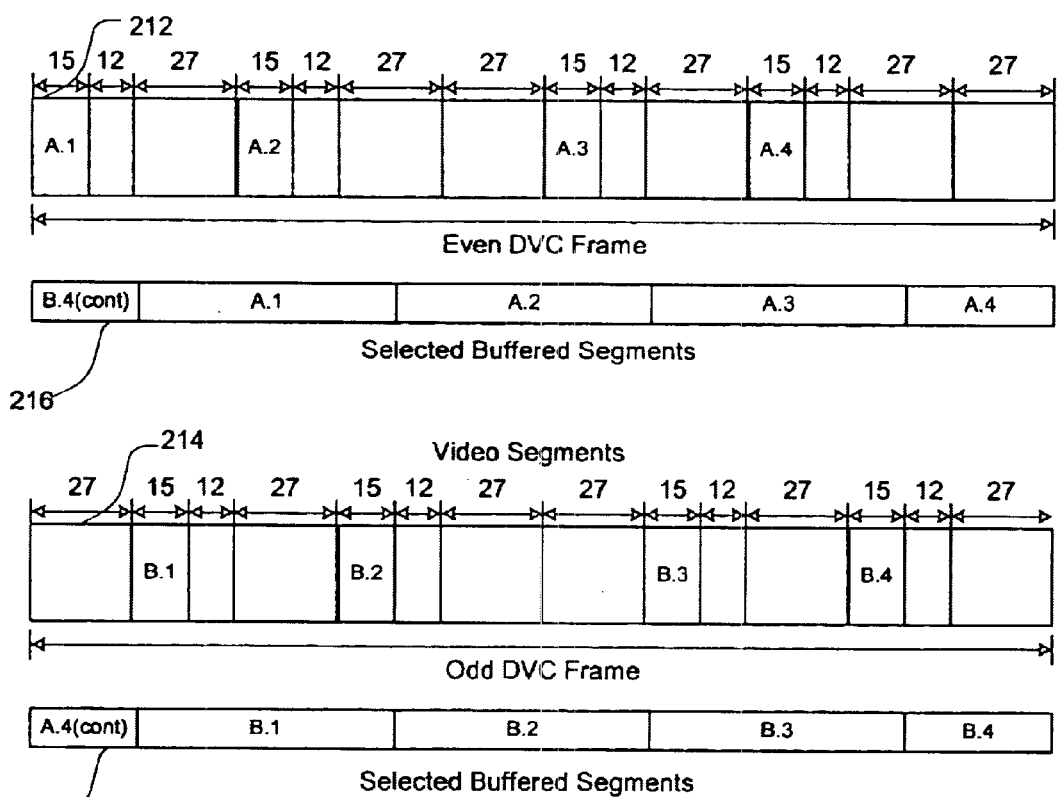
FIG. 16
FIG. 17

| | Copy Pixels From Left of Block |
| | Copy Pixels From Right of Block |
| | Mirror Pixels From Edge of Block |

| A0,0 | A0,1<br>a | A0,1<br>b | A0,3 | A0,5 | A0,6<br>a | A0,6<br>b | A0,8 |
|---|---|---|---|---|---|---|---|
| | A0,2 | | A0,4 | | A0,7 | | A0,9 |
| A1,0 | A1,1<br>a | A1,1<br>b | A1,3 | A1,5 | A1,6<br>a | A1,6<br>b | A1,8 |
| | A1,2 | | A1,4 | | A1,7 | | A1,9 |
| A2,0 | A2,1<br>a | A2,1<br>b | A2,3 | A2,5 | A2,6<br>a | A2,6<br>b | A2,8 |
| | A2,2 | | A2,4 | | A2,7 | | A2,9 |
| A3,0 | A3,1<br>a | A3,1<br>b | A3,3 | A3,5 | A3,6<br>a | A3,6<br>b | A3,8 |
| | A3,2 | | A3,4 | | A3,7 | | A3,9 |
| A4,0 | A4,1<br>a | A4,1<br>b | A4,3 | A4,5 | A4,6<br>a | A4,6<br>b | A4,8 |
| | A4,2 | | A4,4 | | A4,7 | | A4,9 |

| B0,0 | B0,1 | B0,2 | B0,3 | B0,5 | B0,6 | B0,7 | B0,8 |
|---|---|---|---|---|---|---|---|
| | | | B0,4 | | | | B0,9 |
| B1,0 | B1,1 | B1,2 | B1,3 | B1,5 | B1,6 | B1,7 | B1,8 |
| | | | B1,4 | | | | B1,9 |
| B2,0 | B2,1 | B2,2 | B2,3 | B2,5 | B2,6 | B2,7 | B2,8 |
| | | | B2,4 | | | | B2,9 |
| B3,0 | B3,1 | B3,2 | B3,3 | B3,5 | B3,6 | B3,7 | B3,8 |
| | | | B3,4 | | | | B3,9 |
| B4,0 | B4,1 | B4,2 | B4,3 | B4,5 | B4,6 | B4,7 | B4,8 |
| | | | B4,4 | | | | B4,9 |

Copy Pixels From Left of Block
Copy Pixels From Right of Block
Mirror Pixels From Edge of Block

EFFICIENT TRANSMISSION OF QUARTER-VGA IMAGES USING DVC CODECS

FIELD OF THE INVENTION

This present invention relates to digital image coding, and more particularly to a method and apparatus for encoding digital video into a compressed digital video stream, and a corresponding method and apparatus for decoding a compressed digital video stream.

BACKGROUND OF THE INVENTION

DVC is a common acronym for a digital video coding standard presently in widespread use for digital handheld camcorders, digital video recorders, digital video playback devices, etc. *See Recording—Helical-scan digital video cassette recording system using 6.35 mm magnetic tape for consumer use (525-60, 625-50, 1125-60 and 1250-50 systems)*, International Electrotechnical Commission Standard, IEC 61834 (1998). This standard describes the content, formatting, and recording method for the audio, video, and system data blocks forming the helical records on a DVC tape. It also specifies the DVC video frame format for compatibility with different television signal formats, including the 525-horizontal-line, 60 Hz frame rate broadcast format common in the United States (the 525-60 format), and the 625-horizontal-line, 50 Hz frame rate broadcast format common in many other countries (the 625-50 format).

Examining the 525-60 DVC video frame format in particular, FIG. 1 illustrates the digital sample structure for the luminance component of a 525-60 format video frame. A video frame 30 is divided into a tiling of superblocks S0,0 to S9,4. Each superblock takes one of three possible superblock shapes 32, 34, 36, depending on the superblock's position in frame 30. Also, each superblock is divided into 27 macroblocks. Most of these macroblocks are of the format shown for macroblock 38 (four blocks arranged horizontally), although for superblock shape 36, three macroblocks have the format shown for macroblock 40 (four blocks arranged 2×2).

Macroblocks 38 and 40 each contain four luminance blocks 42. Each luminance block 42 contains 64 digital samples 44, arranged in a regular 8×8 grid. Each macroblock also contains one 64-sample Cr and one 64-sample Cb block (not shown), for a total of six blocks of samples per macroblock. The total frame size is 720 digital samples (90 luminance blocks) wide by 480 digital samples (60 luminance blocks) high.

DVC encoder chips are commercially available. These chips generally have two modes of operation: an encoding mode that converts video frames into an encoded stream of video segments, and a decoding mode that converts an encoded stream of video segments back into video frames. The basic operation of the encoding mode of a DVC encoder chip is shown in FIG. 2 as two concurrent processes, Process A and Process B.

Process A operates on an incoming pixel stream representing a raster-sampled video frame. Block 50 performs a horizontal lowpass filter to smooth the data. The smoothed pixels are gathered at block 52 until eight lines are present, representing 90 blocks of luminance data (45 blocks of chrominance data are also processed concurrently, not shown). An 8×8 Discrete Cosine Transform (DCT) is performed on each of the 90 pixel blocks at 54, and the blocks are stored to frame buffer A at block 56. This process loops until an entire frame of DCT data has been stored to frame buffer A, and then repeats for the next frame using a frame buffer B.

At the same time that Process A is performing DCTs and storing data to frame buffer A, Process B is reading stored DCT data (from the previous frame) from frame buffer B. Thus at block 60, process B selects DCT data corresponding to a video segment that is to be created next. At block 62, it reads five macroblocks, corresponding to this DCT data, from frame buffer B. At block 64, these five macroblocks are encoded together into a fixed-length video segment by a complex quantization and coding process that can allow less-detailed macroblocks to "share" unused portions of their bit allotment to more-detailed macroblocks. In general, block 64 results in some loss of data in order to fit the five macroblocks into the allowable space, although the data discarded is selected to (hopefully) have a low impact on perceived picture quality. Finally, at block 66, the encoded video segment is output from the DVC chip and Process B loops back up to produce the next video segment.

The five macroblocks encoded in a DVC video segment are selected from scattered regions of the digital video frame in order to distribute the effects of physical data recording errors. FIGS. 3, 4a, 4b, and 4c illustrate how the five macroblocks corresponding to a particular video segment are selected. Generally, five superblocks S0,0, S1,6, S2,2, S3,8, and S4,4 are coded into the first twenty-seven video segments, each video segment representing one macroblock from each of the five superblocks shown. Scan paths 72 (FIG. 4a), 74 (FIG. 4b), and 76 (FIG. 4c) illustrate the order of macroblock selection for each particular superblock shape. Thus the first video segment will combine the first macroblock in scan path 72 for each of S0,0 and S2,2 with the first macroblock in scan path 74 for each of S1,6 and S3,8 and the first macroblock in scan path 76 from S4,4. The second video segment will combine the second macroblocks in these scan paths, etc.

When the five superblocks shown have been converted into twenty-seven video segments, encoding for those superblocks is complete. The process then performs a second encoding pass using the five superblocks immediately below the first five superblocks to generate 27 more video segments, and repeats. After the bottom superblock in any superblock column has been encoded, the process "wraps" to the head of that column on the next pass and continues until ten passes have been made.

SUMMARY OF THE INVENTION

The DVC process provides efficient digital compression for its designed frame formats, and low-cost DVC chips are available. Unfortunately, the staggered five-macroblock-shared video segment design hinders efficient use of the DVC chip with any frame format other than those of its design. For instance, a quarter-VGA (QVGA) frame is 320 pixels wide by 240 pixels high, less than one-fourth the size of a DVC 525-60 frame (720×480 pixels). If a QVGA subframe were inserted in the top left corner of an otherwise blank DVC 525-60 frame, 3.5 out of every 4.5 pixels in the frame (77.8%) would be blank. But because at least one macroblock of pixels from the QVGA subframe would appear in all but 21 of the 270 video segments created for this frame, over 92% of the fixed-sized video segments must be kept intact in order to preserve the QVGA subframe information. The net result is that the DVC-coded subframe requires more bits to represent a lossy-coded version of the QVGA subframe than the original QVGA subframe required.

The embodiments illustrated herein show an alternative approach that allows standard DVC chips to be used to efficiently code a QVGA subframe, or any other subframe data. Generally, this approach redistributes blocks, from a desired subframe, throughout a DVC frame to correspond with selected DVC video segments, ensuring that video segments of interest will generally be filled with subframe data. By judicious selection of a redistribution mapping, buffer space requirements can be decreased and full DVC compression efficiency can be realized on a subframe. For instance, with a proper redistribution mapping, a QVGA subframe can be represented while discarding 77.8% of the DVC video segments.

In one aspect of the invention, a method for encoding a digital image is disclosed. The method used a digital video coder, such as a DVC coder, that encodes a digital video frame using video segments. A digital image to be encoded is segmented into a set of blocks, and the blocks are presented to the digital video coder as part of a larger, synthesized digital video frame. The blocks are inserted into the digital video frame so as to substantially occupy frame locations corresponding to selected video segments in the video segment encoding order. The synthesized digital video frame is encoded with the digital video coder to produce a coded output stream comprising multiple video segments. From the coded output stream, those video segments corresponding to the digital image are selected.

In another aspect of the invention, a method for transmitting a digital video sequence is disclosed. The method used a digital video coder, such as a DVC coder, that encodes a digital video frame using video segments. An original frame of the digital video sequence is segmented into a set of blocks, and the blocks are presented to the digital video coder as part of a larger, synthesized digital video frame. The blocks are inserted into the digital video frame so as to substantially occupy frame locations corresponding to selected video segments in the video segment encoding order. The synthesized digital video frame is encoded with the digital video coder to produce a coded output stream comprising multiple video segments. From the coded output stream, those video segments corresponding to the digital image are selected and transmitted to a receiver. The selected video segments are inserted into a coded input stream, which is supplied to a digital video decoder for decoding into a second synthesized digital video frame. From the second synthesized digital video frame, reconstructed blocks corresponding to the set of blocks of the original frame of the digital video sequence are selected and combined to form an output digital video frame corresponding to the original frame.

In yet another aspect of the invention, a digital video encoding system is disclosed. The digital video encoding system uses a digital video coder that encodes input digital video frames into output video segments, each video segment representing data from multiple scattered regions of a digital video frame input to the digital video coder. The system also has an input frame buffer, and a mapper to map blocks of data from the input frame buffer to a synthesized digital video frame for input to the digital video coder. The blocks of data are mapped such that they substantially occupy frame locations of the digital video frame corresponding to selected video segments in the video segment encoding order of the digital video coder. The system also has a data selector to select video segments from the digital video coder output corresponding to the blocks of data mapped from the input frame buffer.

In a further aspect of the invention a digital video decoding system is disclosed. The digital video decoding system uses a digital video decoder that decodes input digital video segments into output video frames, each video segment representing data from multiple scattered regions of an output digital video frame. The system also has an input data buffer to buffer video segments, and a data padder to concatenate video segments from the input data buffer with dummy video segments for input to the digital video decoder. The system also has a subframe extractor to map the digital video frame regions corresponding to the video segments supplied from the input data buffer into a reconstructed digital video frame.

BRIEF DESCRIPTION OF THE DRAWING

The invention may be best understood by reading the disclosure with reference to the drawing, wherein:

FIGS. 16 and 17 illustrate a DVC image mapping, and corresponding video segment output timeline, for a third embodiment of the invention;

FIGS. 21a and 21b show a QVGA superblock tiling according to an embodiment of the invention;

FIG. 22 shows a DVC image mapping for the tiling of FIGS. 21a and 21b;

DETAILED DESCRIPTION OF THE PREFERRED EMBODIMENTS

The preferred embodiments disclosed below were selected by way of illustration and not by way of limitation. For instance, although QVGA (320×240) and reduced horizontal resolution (192×240) examples are shown, the principles taught by these examples may be used with virtually any image size. And although the specific examples use a DVC encoder operating in 525-60 mode, the principles taught by these examples are applicable to other DVC modes, and indeed, other encoders that operate similarly to produce video segments.

Figure 1:
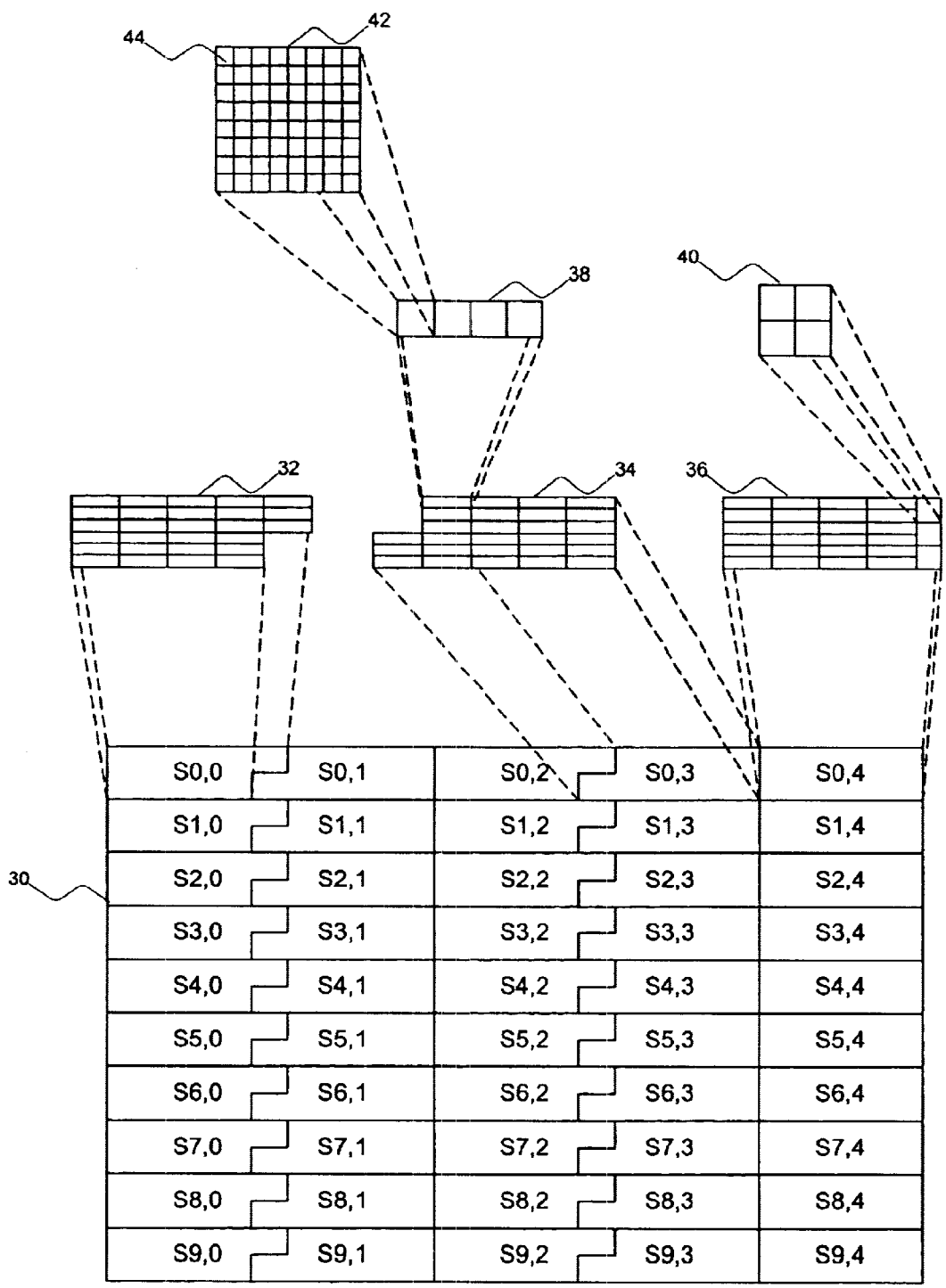
FIG. 1 illustrates the 525-60 frame format for DVC coding.
Figure 2:
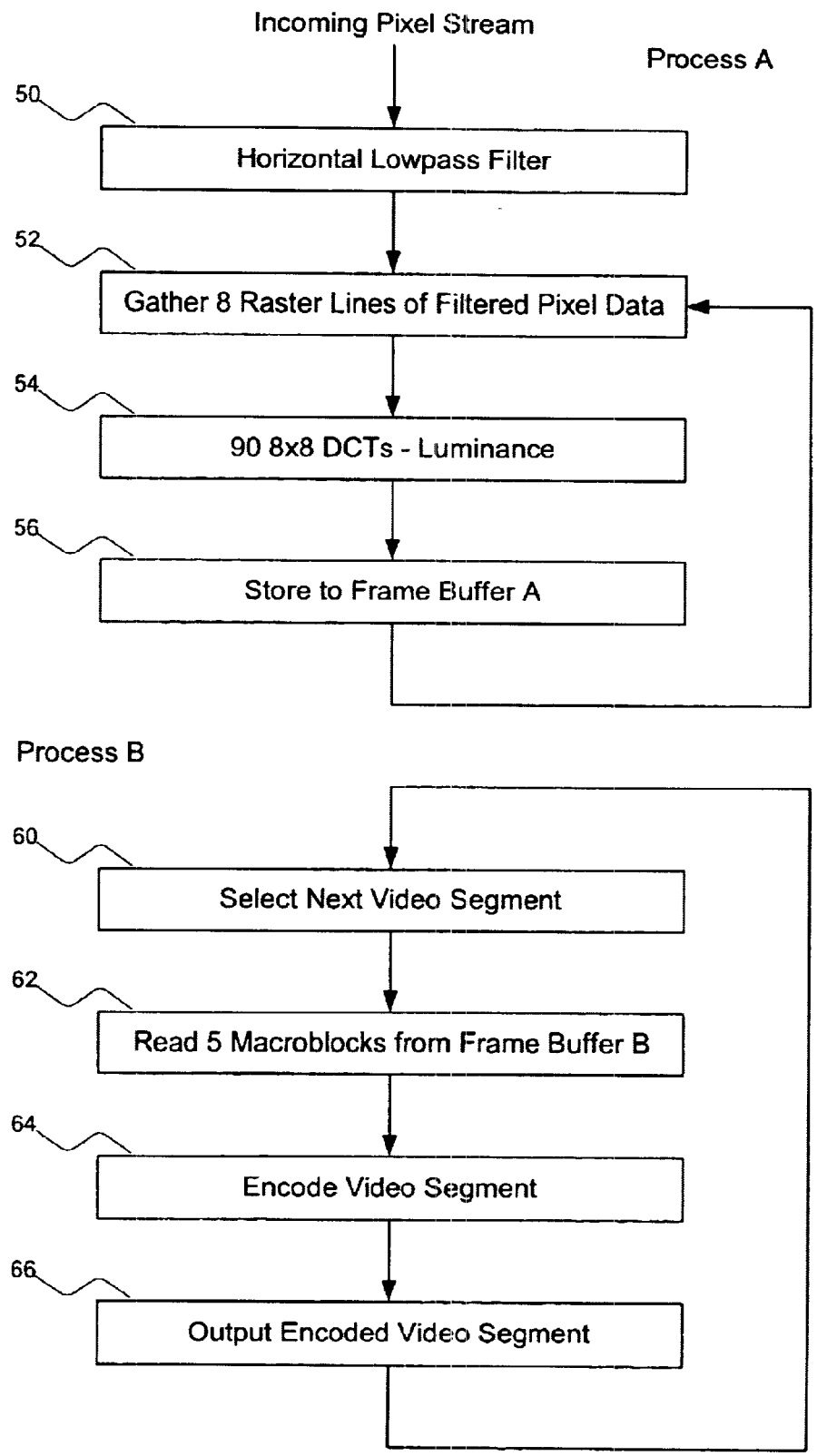
FIG. 2 illustrates the basic operation of a DVC coder.
Figure 3:
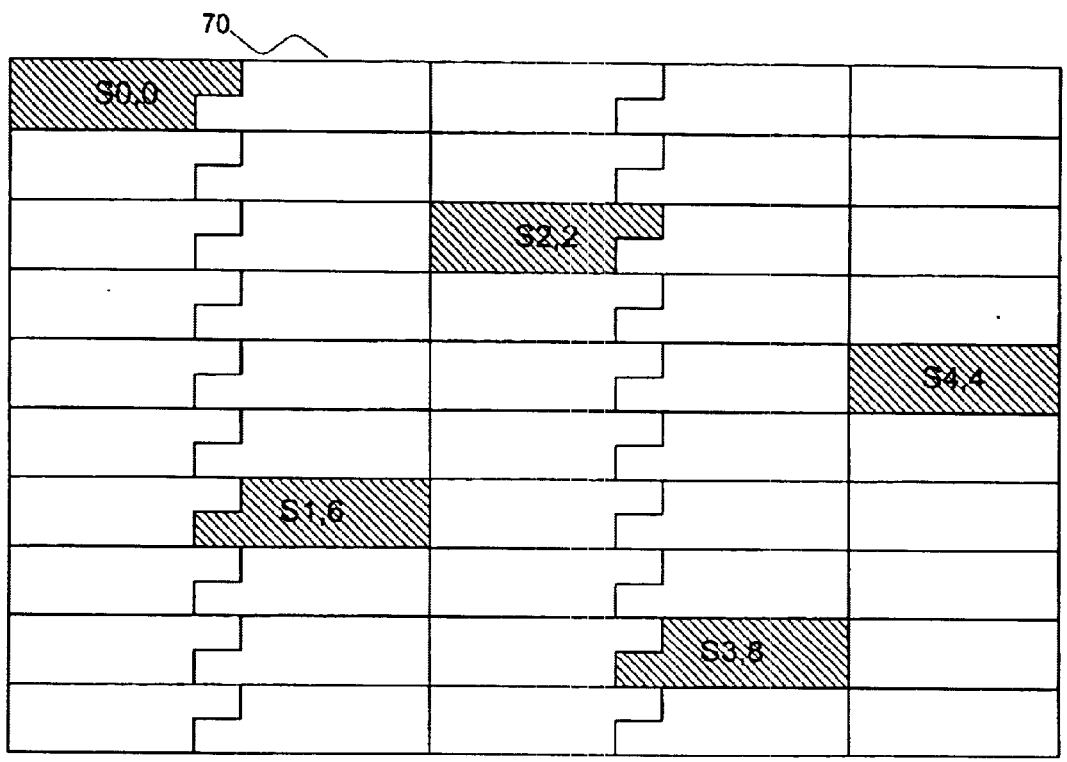
FIGS. 3, 4a, 4b, and 4c illustrate macroblock and superblock coding order for DVC video segments.
Figure 4A:
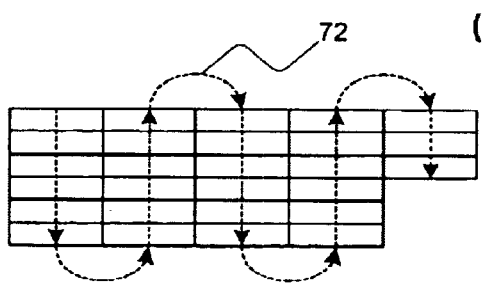
Figure 4B:
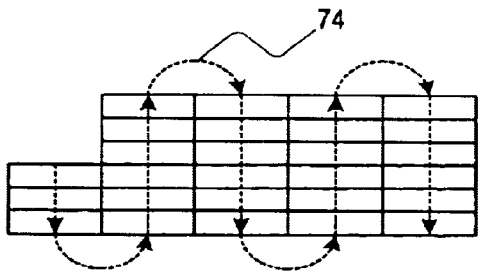
Figure 4C:
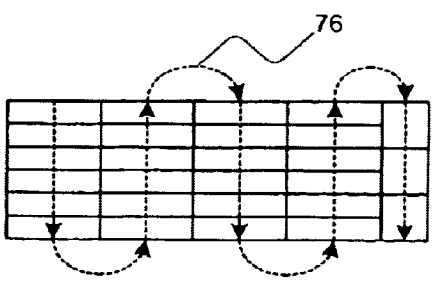
Figure 5:
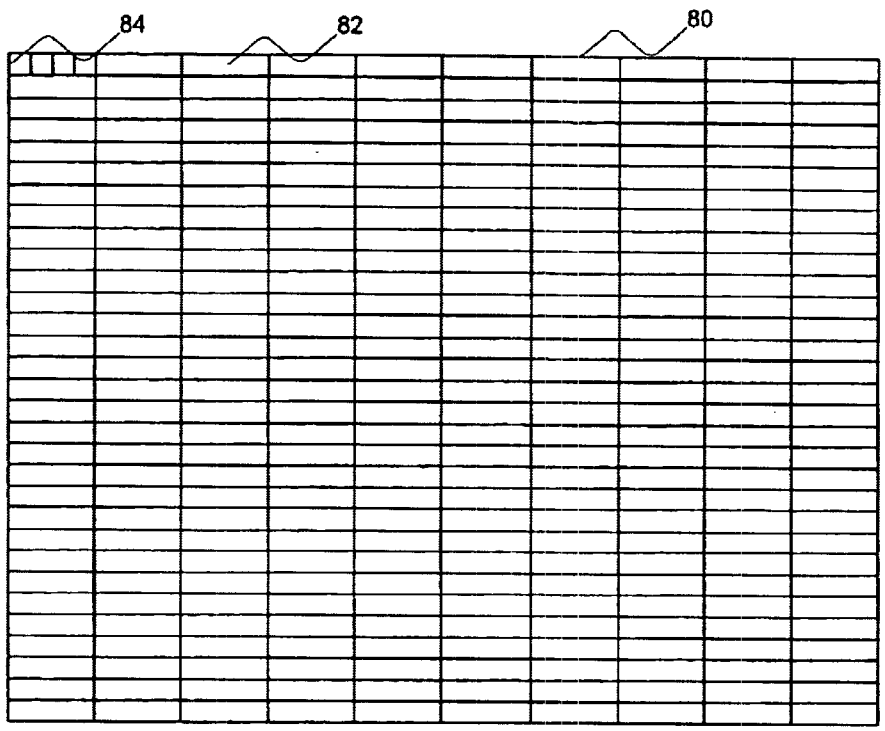
FIGS. 5, 6a, 6b, and 7 illustrate a block tiling for a QVGA image useful with an embodiment of the invention.

To introduce the first example, a 320×240 QVGA luminance frame 80 is shown in FIG. 5. Frame 80 has been divided for purposes of the example into thirty rows by ten columns of macroblocks 82, each macroblock 82 constructed from four horizontally adjacent 8×8 sample blocks 84. Typically, each macroblock will also contain a 4×16 Cr and a 4×16 Cb block (not shown). This macroblock configuration matches the configuration described for macroblock 38 of FIG. 1.

Figure 6A:
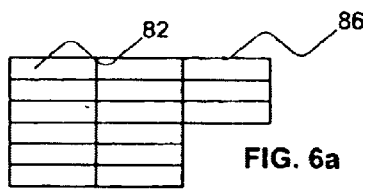
Figure 6B:
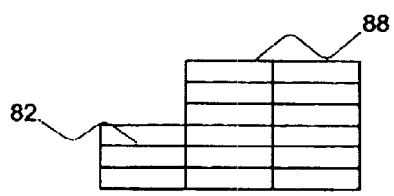

FIGS. 6a and 6b show, respectively, two superblock patterns 86 and 88. Each of superblock patterns 86 and 88 contains fifteen macroblocks 82, arranged as two-and-one-half columns of six rows of macroblocks. The selection of the particular shapes is related to the video segment macroblock scan order of the DVC encoder, and the reasons for these selected shapes will become more apparent as the example progresses. Note that as frame 80 contains 300 macroblocks, twenty of these fifteen-macroblock superblocks will completely tile frame 80 if a suitable tiling can be found.

Figure 7:
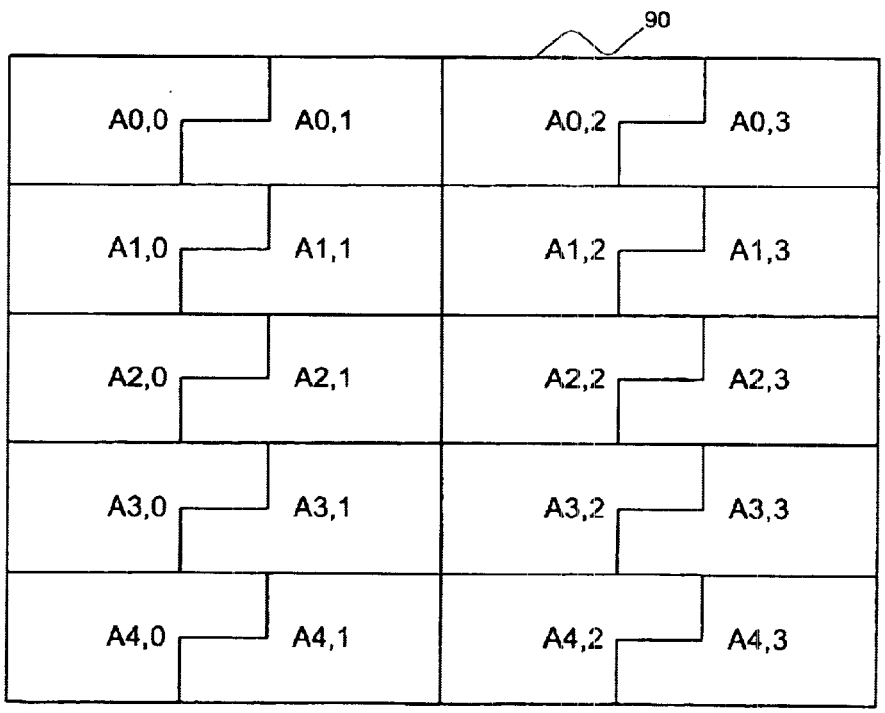

FIG. 7 shows such a tiling 90. A first column of five superblocks of the superblock 86 pattern are interlocked with a second column of five superblocks of the superblock 88 pattern. A third column of five superblocks of the superblock 86 pattern are located adjacent the second column, and interlocked with a fourth column of five superblocks of the superblock 88 pattern. This tiling 90 regularly tiles QVGA frame 80 with no samples or macroblocks either excluded or left over.

Figure 8:
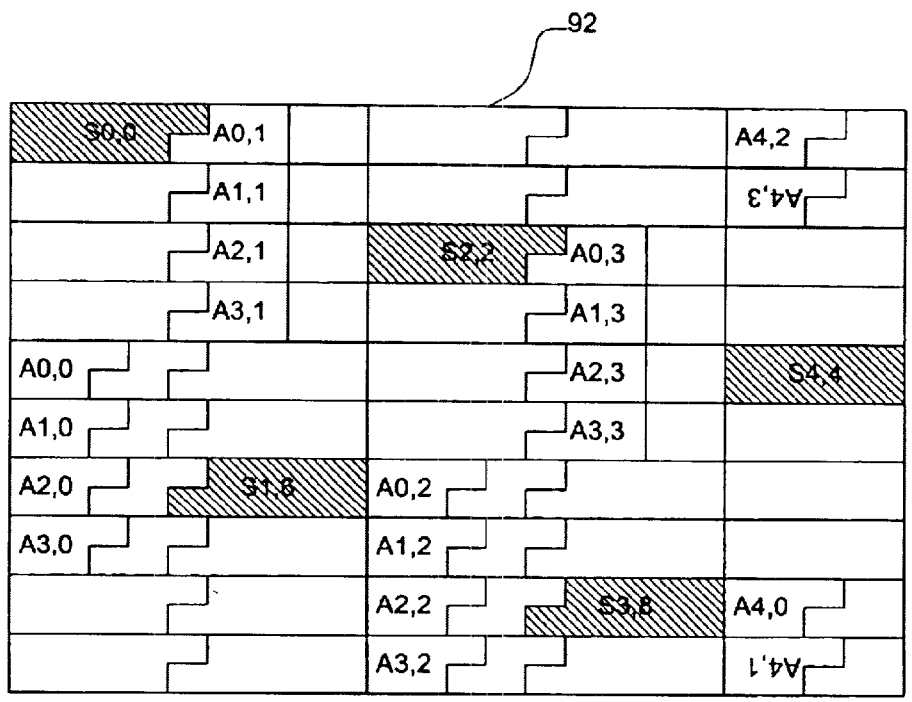
FIGS. 8 and 9 illustrate a DVC image mapping, and corresponding video segment output timeline, for the block tiling of FIG. 7.

The tiling is now mapped onto an otherwise blank DVC 525-60 frame 92, as shown in FIG. 8 (the first five superblocks to be encoded are highlighted for reference, but contain blank data also). The particular mapping shown accomplishes several design goals. First, the Ay,x QVGA superblocks have been staggered to correspond to the staggered sampling order used for video segment construction. This ensures that an Ay,x superblock will be considered along with four other Ay,x superblocks (rather than with blank superblocks) at the time of video segment construction. Second, the Ay,x superblocks of FIG. 7 have been aligned with the Sy',x' superblocks of FIG. 8, such that although the Ay,x superblocks are different in size than the Sy',x' superblocks, each video segment produced will either contain Ay,x data in all five of its macroblocks or blank data in all five macroblocks.

Figure 9:
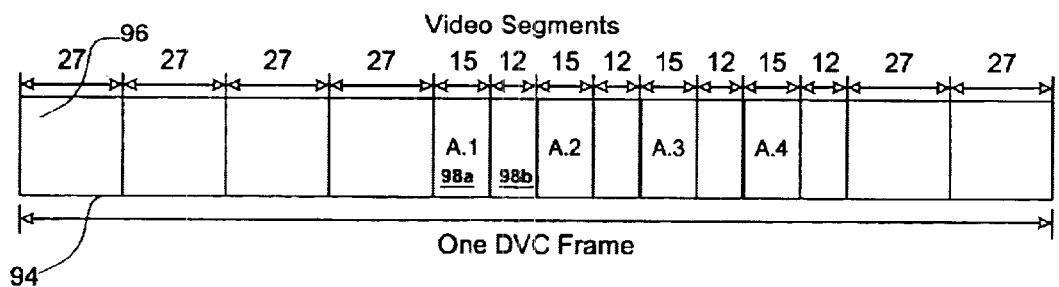

FIG. 9 illustrates the advantageous effects of this superblock mapping. FIG. 9 shows, on a time line, the temporal video segment output 94 of a DVC chip. Each group of 27 video segments (e.g., group 96) represents the encoding time for five staggered DVC superblocks (e.g., S0,0, S1,6, S2,2, S3,8, and S4,4 for group 96). The first four of these groups are blank, since the mapping of the QVGA frame placed no data in the corresponding superblocks. Beginning with subgroup 98a, QVGA frame data A.1 is represented in 15 consecutive video segments. A.1 corresponds to QVGA superblocks A0,0, A0,1, A0,2, A0,3, and A4,0. Subgroup 98b, consisting of twelve video segments, is again blank, since the QVGA superblocks do not completely fill the underlying DVC superblocks. This fifteen QVGA data/twelve blank data format is repeated three more times, followed by two final groups of 27 blank video segments each.

The tiling/mapping of this example has effectively placed the QVGA frame in the minimum possible number of DVC video segments (60), instead of spreading the QVGA frame information amongst virtually all of the 270 DVC video segments. The 210 blank DVC video segments can be discarded at the encoder output, and the 60 valid segments efficiently stored or transmitted.

Figure 10:
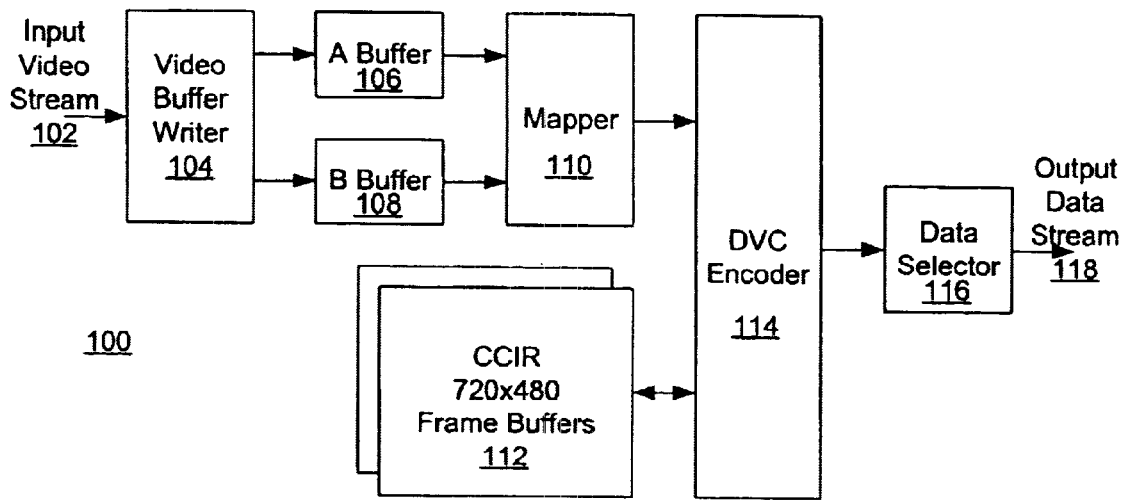
FIGS. 10 and 11 show block diagrams for a QVGA encoding system and a QVGA decoding system according to one embodiment of the invention.

FIG. 10 illustrates a block diagram for one possible hardware configuration useful with the preceding example. Encoding system 100 accepts an input video stream 102. Video stream 102 is digitized in a QVGA frame format by video buffer writer 104, which stores successive frames alternately to A buffer 106 and B buffer 108. Mapper 110 provides synthesized, rasterized 525-60 formatted frame data to DVC encoder 114 according to the mapping shown in FIG. 8. Thus mapper 110 supplies 480 rows of 720 luminance sample data, by either selecting a constant pixel value for "blank" pixels, or by reading QVGA data for mapped QVGA superblock pixels from either A buffer 106 or B buffer 108 (whichever is not currently being overwritten by video buffer writer 104).

DVC encoder 114 uses frame buffers 112 to encode the synthesized frame data supplied by mapper 110 into DVC-formatted video segments. Finally, data selector 116 filters the video segment data to produce output data stream 118, e.g., consisting of the video segment groups A.1, A.2, A.3, and A.4 of FIG. 9.

Figure 11:
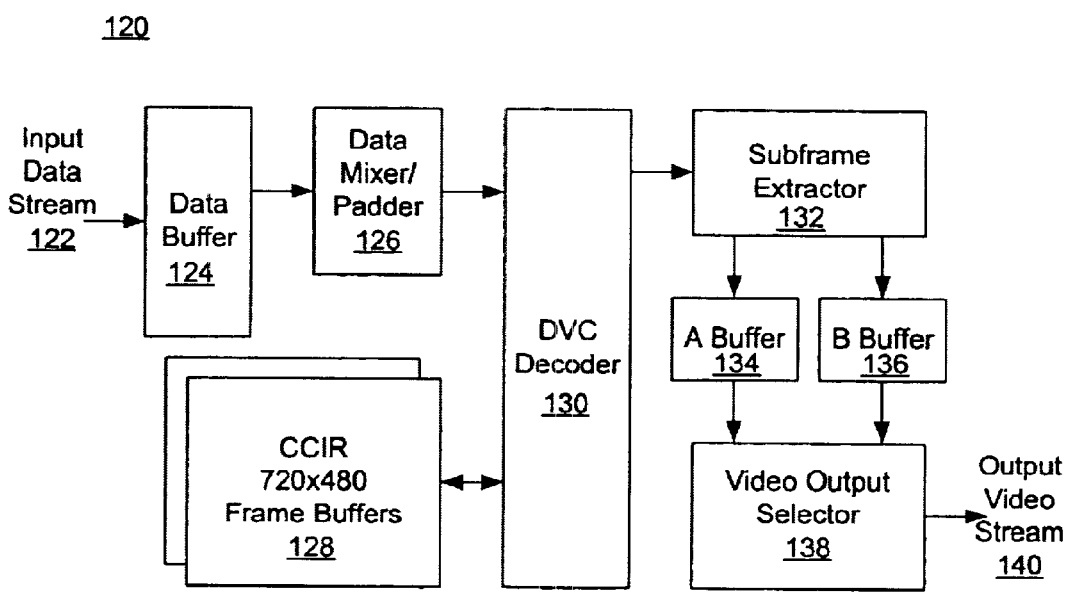

FIG. 11 illustrates a block diagram for one possible hardware configuration useful in decoding a data stream produced by encoding system 100. Decoding system 120 accepts an input data stream 122, after system 120 has been configured to recognize the frame format represented in the data stream. For instance, if the frame format is DVC-coded QVGA, decoding system 120 will expect 60 DVC video segments per QVGA frame and will know where these 60 segments map to in the DVC frame format. An appropriate synchronization signal can be supplied to indicate the beginning of a new frame.

Input data stream 122 is read into data buffer 124. Data mixer/padder 126 uses the data from buffer 124 to create a coded input stream, e.g., like that of FIG. 9 (although the video segments from input data stream 122 could be placed anywhere in the coded stream, as long as they are treated consistently). Note that DVC decoder 130 accepts segments in a particular format specified for DVC, even if blank data is represented. This may include blank VAUX (video auxiliary) data segments. For blank video and VAUX segments, padding data such as the following hex data sequences can be used for padding:

VAUX

0x29, 0x7d, 0x50, 0xb7, 0x9c, 0xac, 0xc1, 0xb5,
0xd1, 0x91, 0x02, 0x4d, 0x3d, 0xc3, 0xf8, 0xec,
0x52, 0xfa, 0xa1, 0x6f, 0x39, 0x59, 0x83, 0x6b,
0xa3, 0x22, 0x04, 0x9a, 0x7b, 0x87, 0xf1, 0xd8,
0xa5, 0xf5, 0x42, 0xde, 0x72, 0xb3, 0x06, 0xd7,
0x46, 0x44, 0x09, 0x34, 0xf7, 0x0f, 0xe3, 0xb1,
0x4b, 0xea, 0x85, 0xbc, 0xe5, 0x66, 0x0d, 0xae,
0x8c, 0x88, 0x12, 0x69, 0xee, 0x1f, 0xc7, 0x62,
0x97, 0xd5, 0x0b, 0x79, 0xca, 0xcc, 0x1b, 0x5d,
0x19, 0x10, 0x24, 0xd3, 0xdc, 0x3f, 0x8e, 0xc5,
0x2f, 0xaa, 0x16, 0xf3, 0x95, 0x98, 0x36, 0xba Blank Video 0x29, 0x7d, 0x50, 0xb8, 0x9c, 0xaa, 0xc1, 0xb5,
0xd1, 0x91, 0x02, 0x4d, 0x3d, 0xc3, 0xf8, 0xec, 0x52, 0xfa, 0xa1, 0x69, 0x39, 0x59, 0x83, 0x6b,
0xa3, 0x22, 0x04, 0x9a, 0x7b, 0x87, 0xf1, 0xd8,
0xa5, 0xf3, 0x42, 0xde, 0x72, 0xb3, 0x06, 0xd7,
0x46, 0x44, 0x09, 0x34, 0xf7, 0x0f, 0xe3, 0xb7,
0x4b, 0xea, 0x85, 0xbc, 0xe5, 0x66, 0x0d, 0xae,
0x8c, 0x88, 0x12, 0x69, 0xee, 0x09, 0xc7, 0x62,
0x97, 0xd5, 0x0b, 0x79, 0xca, 0xcc, 0x1b, 0x7b,
0x19, 0x10, 0x24, 0xd3, 0xdc, 0x3f, 0x8e, 0xc5,
0x2f, 0xaa, 0x16, 0xf3, 0x95, 0x98, 0x36, 0xba DVC decoder 130 accepts the coded input stream from data mixer/padder 126. Using frame buffers 128, decoder 130 produces a synthesized digital video frame. This synthesized frame is passed to subframe extractor 132. Subframe extractor 132 gathers blocks from the synthesized frame that correspond to the input data stream 122, i.e., those that represent reconstructed blocks corresponding to the original QVGA video frame input at the encoder. These blocks are written into either A buffer 134 or B buffer 136 in appropriate locations to reconstruct a QVGA image. Finally, video output selector 138 produces an output video stream 140 by reading raster data from either A buffer 134 or B buffer 136 (i.e., the buffer that is not currently being written to by subframe extractor 132).

Many other possibilities exist for mapping schemes and hardware according to embodiments of the invention. For example, FIGS. 12–16 illustrate concepts in a second embodiment that reduces buffer requirements.

Figure 12:
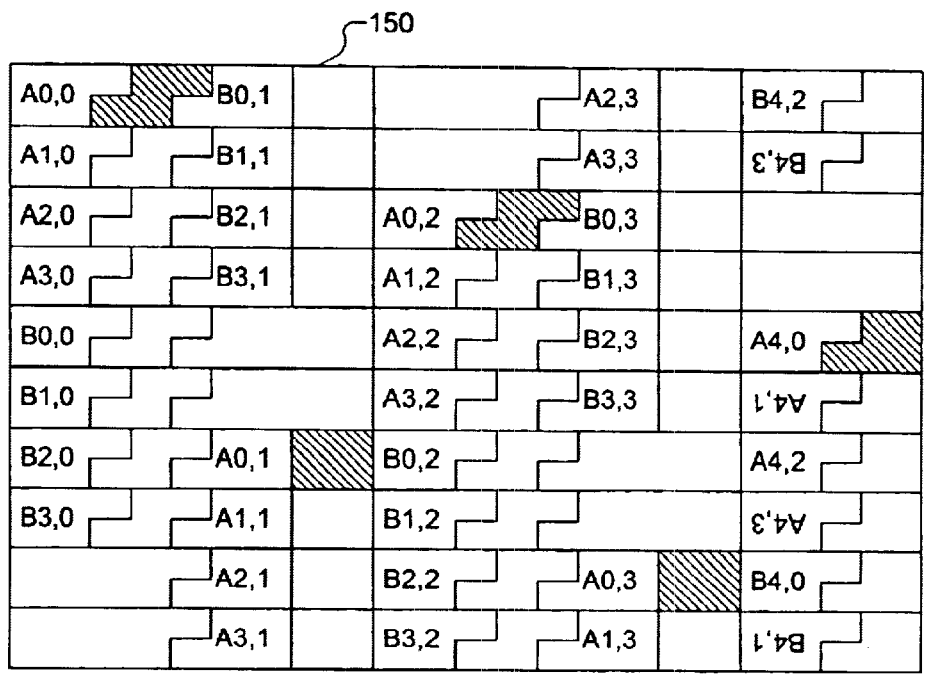
FIGS. 12 and 13 illustrate a DVC image mapping, and corresponding video segment output timeline, for a second embodiment of the invention.

Referring to FIG. 12, a mapping of two QVGA frames (frames A and B) onto a DVC 525-60 frame is shown. This mapping illustrates that two frames can be mapped in a manner that avoids both appearing in the same video segment, and also in a manner that avoids placing data from frame A horizontally adjacent with data from frame B (this is a consideration, e.g., if the DVC encoder runs a horizontal smoothing filter).

The two frame mapping is desirable because it enables a reduction in the number of 720×480 DVC frames buffers required from two to one. This is achieved by presenting each QVGA frame to the DVC encoder for two successive DVC frame times. The A and B presentation times are staggered, i.e., the A frame can be changed at odd frame times and the B frame changed at even frame times. The frame that is not being changed represents the valid output data for that frame time.

Figure 13:
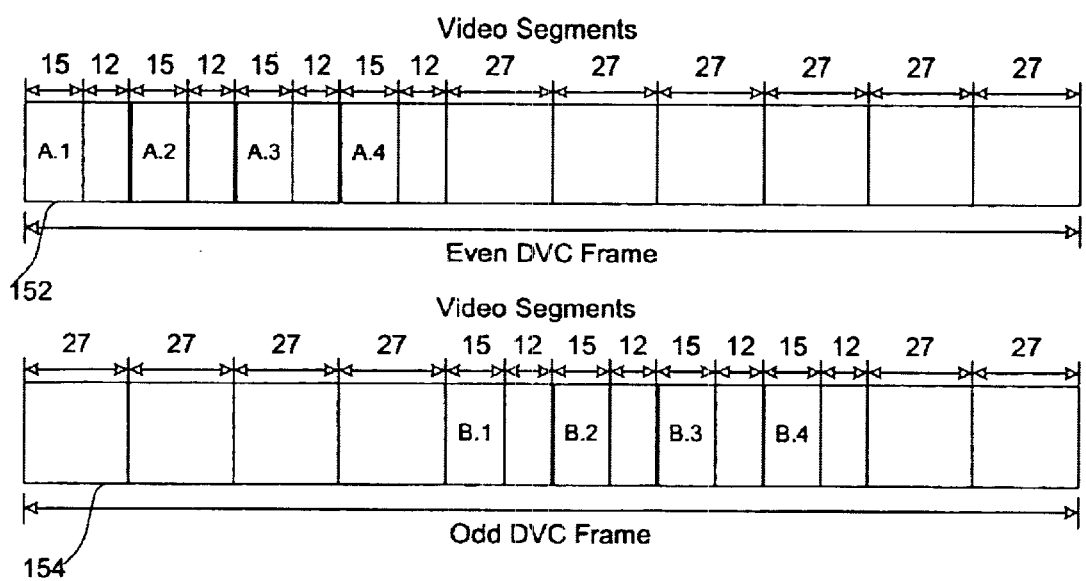

FIG. 13 shows the valid video segments for an even and an odd DVC frame according to this mapping. Four A-groups of video segments A.1, A.2, A.3, A.4 appear in the first four 27-video segment groups of an even DVC frame. Four B-groups of video segments B.1, B.2, B.3, B.4 appear in the second four 27-video segment groups of an odd DVC frame. Note that although other video segments may possibly contain some valid data, this generally cannot be relied upon.

Figures 14, 15:
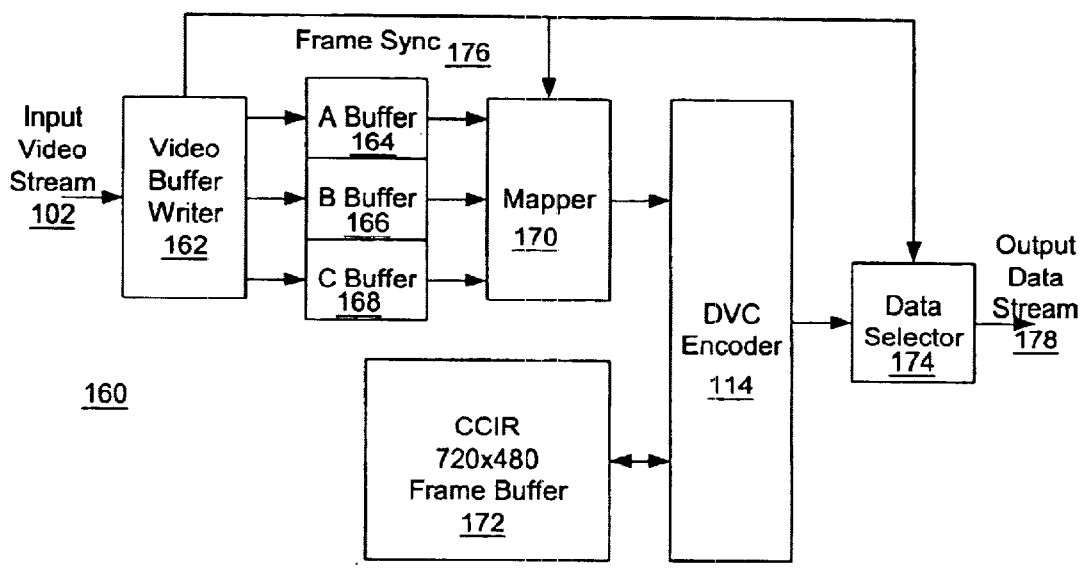
FIG. 14 depicts a block diagram for a QVGA encoding system useful with the mapping of FIG. 12.
FIG. 15 shows processing timing for the encoding system of FIG. 14.

FIG. 14 depicts a block diagram for an encoding system 160 useful with the two frame mapping of FIGS. 12 and 13. Encoding system 160 has a C buffer 168 that is not present in encoding system 100 of FIG. 10. In exchange for this addition, encoding system 160 requires only one DVC frame buffer 172, instead of the two DVC frame buffers 112 of encoding system 100. As a DVC frame buffer is 4.5 times the size of a QVGA frame buffer, this results in substantial memory savings.

Video buffer writer 162 stores frames alternately to one of A buffer 164, B buffer 166, and C buffer 168. Video buffer writer 162 also creates a frame sync signal 176, to indicate to mapper 170 and data selector 174 where in the repeating storage sequence the encoding system is operating. Mapper 170 utilizes frame sync signal 176 to determine which two of the buffers 164, 166, 168 are not being written to by buffer writer 176, and reads data from those two buffers to create an input stream for DVC encoder 114.

In operation, DVC encoder 114 performs its first-pass operations (DCT calculation and storage) and second-pass operations (video segment creation) using the single frame buffer 172. Although this means that the DCT values used to create video segments will be changing as video segments are created, because the input QVGA values are repeated for two frames, DCT values corresponding to the repeated areas can be relied on for one frame time. This concept is further illustrated in FIG. 15, as explained below.

FIG. 15 indicates the values present at various points in encoding system 160 during six consecutive frame times, T0 through T5. During each frame time Tn, a corresponding QVGA frame F(Tn) is input to encoding system 160. Thus at T0, the system is initialized and a first QVGA frame F(0) is stored in Buffer A. At T1, frame F(1) is stored in buffer B, while frame F(0) is read from buffer A and a null image is read from Buffer C. Frame F(0) and the null image are mixed at mapper 170, F(0) forming the "A" blocks of FIG. 12, the null frame forming the "B" blocks of FIG. 12. During T1, DCTs are performed on this mixed image and stored in frame buffer 172, such that at the beginning of T2, frame buffer 172 contains DCTs for this mixed image.

During T2, F(0) is again read from buffer A and used to form the "A" blocks of the mixed image. F(1) is read from buffer B and used to form the "B" blocks of the mixed image. As DCTs are performed on the blocks and written to frame buffer 172, the "A" blocks will be overwritten with the same data—these blocks are thus stable during time T2. But the null image DCT data stored in the B blocks will gradually be overwritten with DCT data from F(1) during T2. Thus the "encoded image" represented in the sequence of video segments output by DVC encoder 114 during T2 will consist of valid video segments corresponding to F(0) (see timeline 152 of FIG. 13), and generally unreliable video segments corresponding to either the null image or F(1). Note that during T2, F(2) is being stored to buffer C. Data selector 174 selects the F(0) video segments for output from the system, two frame times after frame F(0) was input to the system.

During T3, F(1) is again read from buffer B and used to form the "B" blocks of the mixed image. F(2) is read from buffer C and used to form the "A" blocks of the mixed image. Thus during T3, the B blocks are stable and the A blocks are changing. During this time period, data selector 174 selects its output according to timeline 154 of FIG. 13, extracting the video segments corresponding to F(1) from the DVC encoder output.

A similar frame progression can be observed for the remaining time periods of FIG. 15, and is not detailed further in this description.

When output data must be buffered for writing to storage media, or transmission to a receiver, a data buffer can be added at output data stream 178. The size of this buffer, as well as its latency, can be affected by the block mapping scheme chosen for the invention. For instance, in order to prevent buffer underflow in a system generating the output of FIG. 13, video segments for a frame must be buffered until after the first four groups of twenty-seven video segments are output from DVC encoder 114. This means that the buffer must be capable of storing an entire collection of "A" video segments, and that the buffer must delay for almost a half-frame before beginning transmission.

FIG. 16 shows an alternate mapping 210 that decreases output buffer size and latency. In this mapping, the first fifteen video segments of an even DVC frame are "A" video segments (see timeline 212 of FIG. 17), followed by 39 video segments to be discarded. In an odd DVC frame, the first twenty-seven video segments are discarded, and the next fifteen video segments are "B" video segments (see timeline 214 of FIG. 17). Groups of "A" and "B" video segments are interspersed throughout the frame, such that the encoder 114 output of valid video segments is less bursty. Timelines 216 and 218 show the timing of buffered output can be arranged to avoid buffer underflow with a latency of just over one-tenth of a frame. Note that the buffer size required for these timelines is roughly three-eighths of a one-frame collection of valid video segments.

Mapping 210 shows an additional feature that can be used to reduce buffer size in both an encoding system and in a decoding system according to the invention. The block arrangement has been modified such that the order in which QVGA superblocks are used in synthesizing a 525-60 frame correlates roughly with the raster order of the synthesized 525-60 frame. This is best visualized by viewing FIG. 18 in conjunction with FIG. 16.

Figure 18:
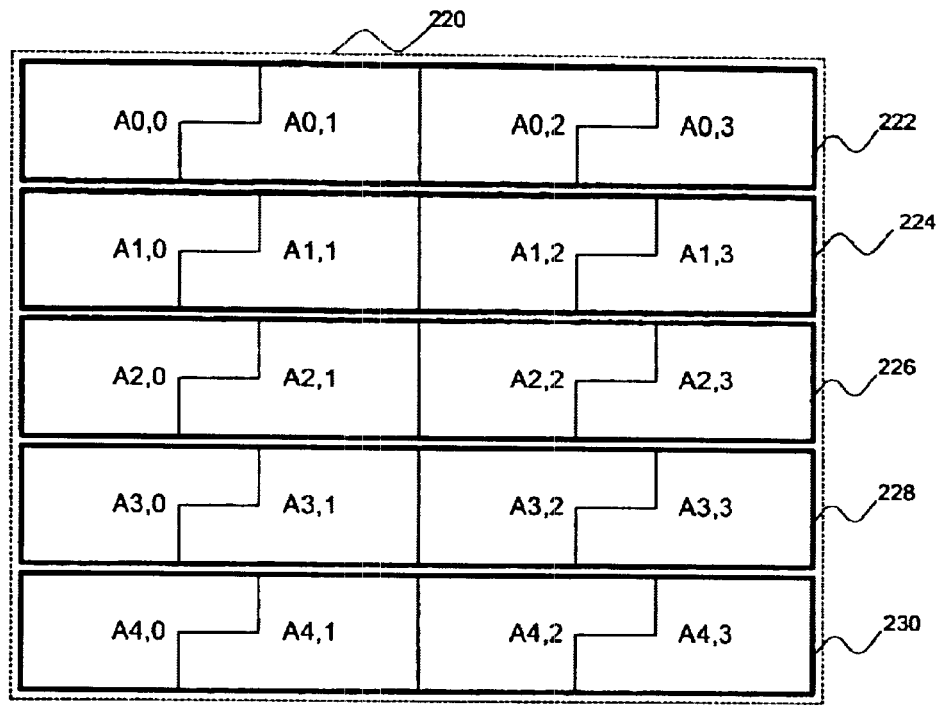
FIG. 18 shows a QVGA superblock tiling useful with the mapping of FIG. 16.

FIG. 18 shows a tiling diagram 220, divided into five sets of four QVGA superblocks each (sets 222, 224, 226, 228, and 230). These superblocks are grouped according to a "superblock raster order", i.e., superblocks are grouped in rows according to a left-to-right, top-to-bottom ordering. Superblock set 222 is mapped such that it occupies the first four valid QVGA superblock mapping positions in mapping 210, i.e., either the four "A" positions or the four "B" positions shown in the first two superblock rows of FIG. 16, depending on whether the frame is even or odd. With this mapping, two effects are achieved. All superblocks in the top fifth of a QVGA frame are used within the first fifth of a frame time as input to the encoder, thus latency at the input buffer can be reduced from one frame to one-fifth of a frame, and buffer size can be reduced accordingly (i.e., for an embodiment like FIG. 10, A buffer 106 and B buffer 108 can be replaced by a single buffer two-fifths of a QVGA frame in length; for an embodiment like FIG. 14, A buffer 164, B buffer 166, and C buffer 168 can be replaced by a single buffer 1.4 times a QVGA frame in length). At the decoder, a single output buffer four-fifths of a QVGA frame in length can be utilized (see buffer 192 of FIG. 19), and latency can be reduced from one frame to one-fifth of a frame.

Using each of the improvements shown in FIGS. 16 and 17, the total latency of a encode-transmit-receive-decode system can be reduced substantially. One-fifth of a frame latency is required at the input to the encoder. One frame latency is required in the DVC encoder. One-tenth of a frame latency is required at the transmit buffer. At the receive buffer, an additional two-tenths of a frame latency is required, followed by a one frame latency in the DVC decoder. Finally, an additional one-fifth of a frame latency is required at the output buffer of the decoding system. This is a total end-to-end delay of about 2.7 frames, or less than a tenth of a second.

Figure 19:
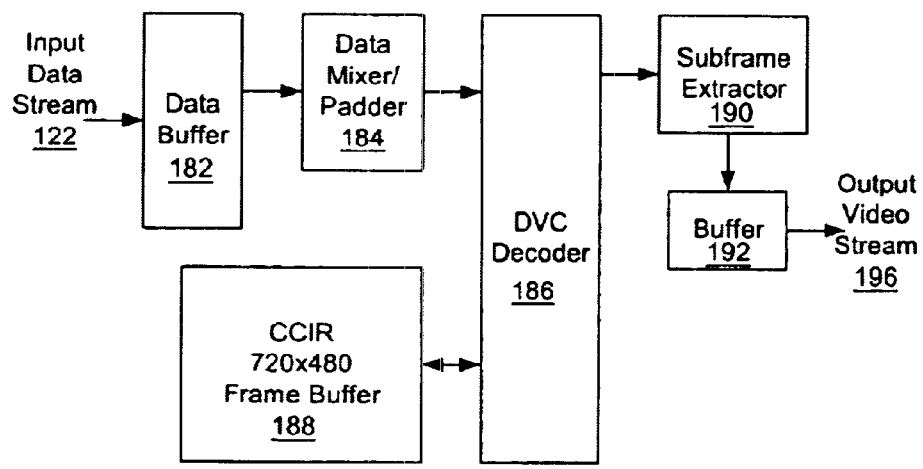
FIG. 19 shows a block diagram for a QVGA decoding system useful with the mapping of FIG. 16.

FIG. 19 shows a decoding system that uses the above improvements in order to function with minimal buffer size. Data buffer 182 is approximately 85 video segments in length, allowing video segments to be used in two consecutive synthesized video segment frame inputs to DVC decoder 186. One 525-60 frame buffer 188 is required for DVC decoder 186. And a four-fifths of a QVGA frame buffer 192 is required at output video stream 196.

Some DVC encoders perform a horizontal filtering operation on their input samples in order to reduce horizontal frequency prior to coding. With such an encoder, the boundaries of a QVGA superblock (where the superblock meets the blank background of a synthesized 525-60 image) are seen as high frequency edges by the filter and blurred with the blank background, resulting in visible artifacts in a reconstructed image. This effect can be avoided by appropriate padding of the QVGA input with surrounding QVGA pixels during synthesis of a 525-60 input image to the DVC encoder.

Figure 20:
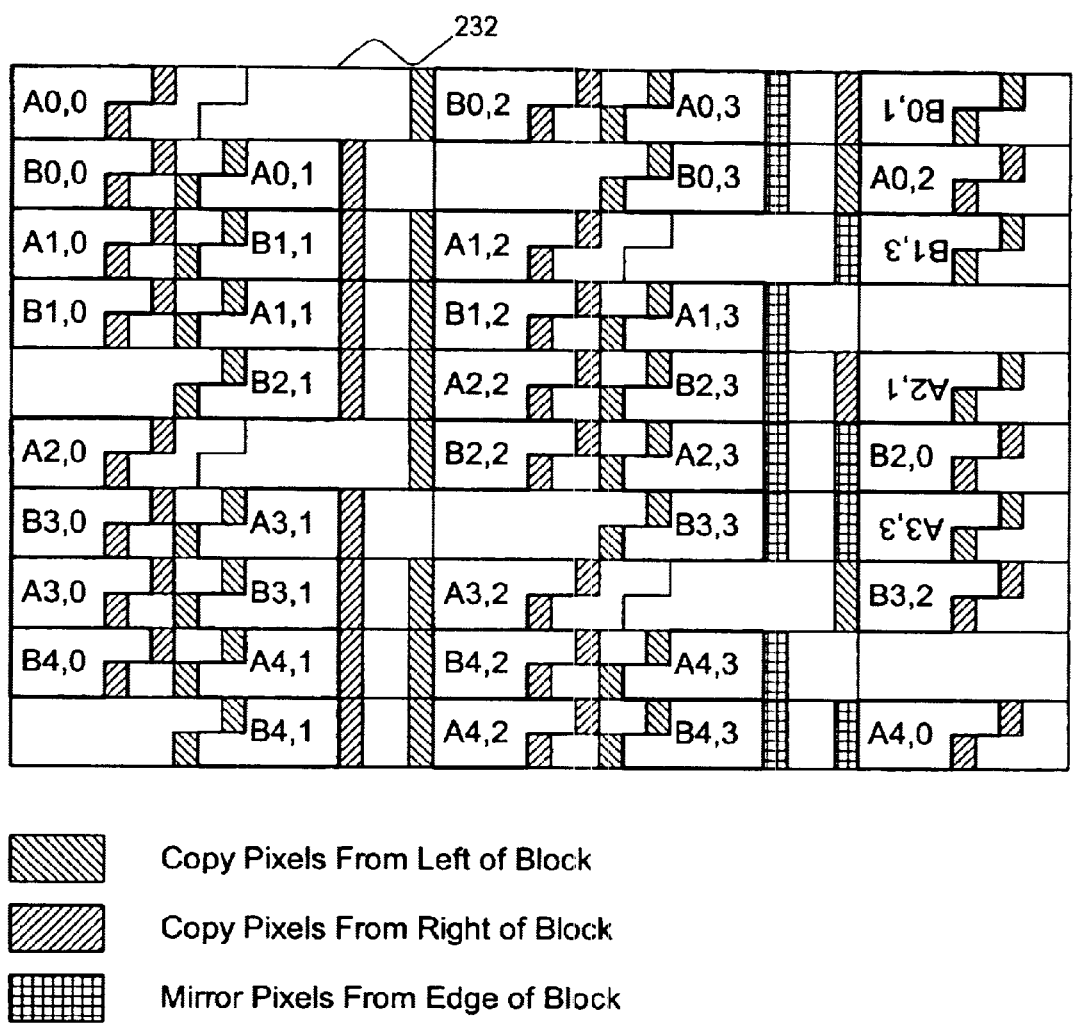
FIG. 20 illustrates data padding mapping for an embodiment of the invention.

FIG. 20 illustrates a mapping 232 similar to mapping 210 of FIG. 16. Mapping 232, however has been padded, i.e., additional pixels have been copied from the QVGA data in locations adjacent to the QVGA superblocks. In the example, a sixteen-pixel-wide pad has been used—other values may be adequate or more appropriate for use with different DVC encoders. Generally, sixteen pixels to the left of a block will be copied to the left of the block in the mapping, and sixteen pixels to the right of a block will be copied to the right of a block in the mapping. If the block resides at the left edge of both the QVGA image and mapping 232, no left copy is used. If the block resides at an edge of the QVGA image, but not at the corresponding edge of mapping 232 (e.g., blocks A0,3 and A4,0), no data is available for copy at that edge; instead, block data is mirrored about that edge. Finally, if a block is flipped in the mapping, the copied padding pixels are flipped with it. Note that this padding data will result in some additional video segment data related to the QVGA image; this data is discarded in the data selector.

The desirable properties illustrated in the preceding embodiments include: 1) full usage of any video segments that carry QVGA information; 2) duplication of QVGA data for two frames to reduce buffer usage; 3) distribution of QVGA data across the video segment output stream to reduce latency and transmit/receive buffer requirements; 4) ordering of the raster order of QVGA superblocks with the raster order of DVC 525-60 superblocks to reduce input and output buffer latency and buffer size; and 5) padding of data to reduce artifacts in the reconstructed image. Taking these properties into account, other mappings are equally possible and may be preferable for some specific systems.

Figure 22:
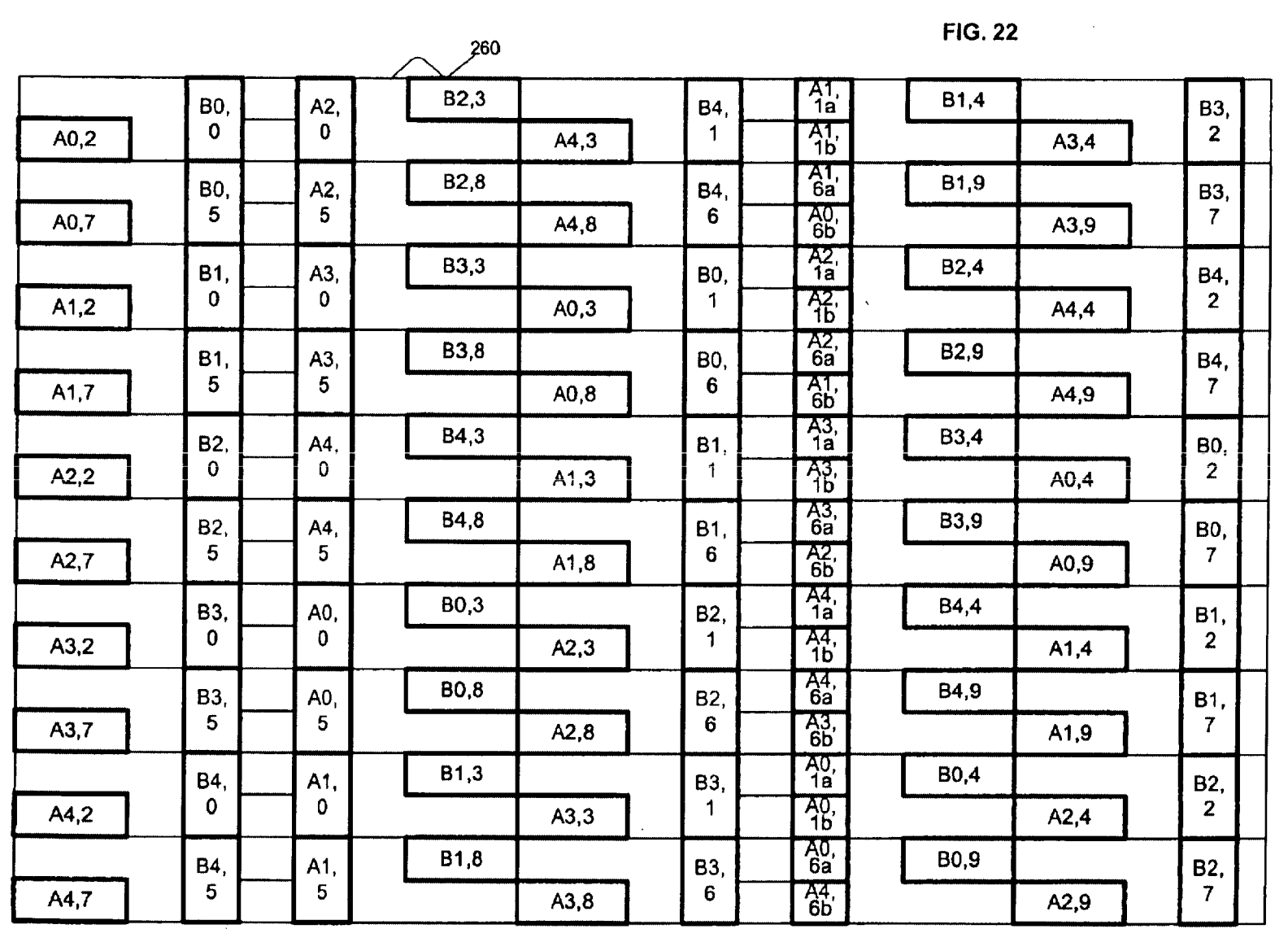

For example, FIGS. 21a and 21b show A frame/B frame tilings 240 and 250. These tilings use smaller superblocks of three different types (1×6, 2×3, and 1×3 macroblocks). In addition, the superblock tiling in the A frame is different from the B frame. This allows the mapping 260 shown in FIG. 22 to be used. This mapping fills requirements 1–4 outlined in the preceding paragraph, while spreading the valid video segment output across the encoder output (or decoder input). In even frames, every set of five DVC superblocks will produce six valid "A" video segments, at the fourth through ninth video segment positions. In odd frames, every set of five DVC superblocks will produce six valid "B" video segments, at the $19^{th}$ through $24^{th}$ video segment positions. This allows the transmit and receive buffer latency and size to be reduced even further than in the preceding examples. Note that mapping 260 can be padded, using the principles illustrated in mapping 232, if desired.

Figure 24:
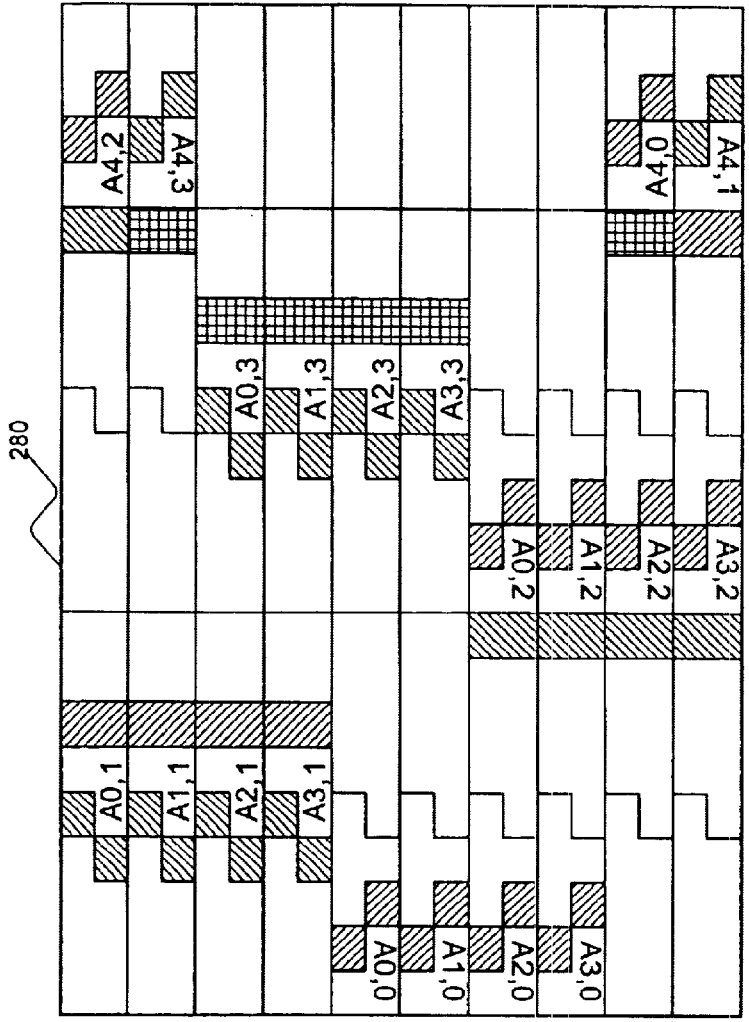
FIG. 24 shows a DVC image mapping for the tiling of FIG. 23.
Figure 23:
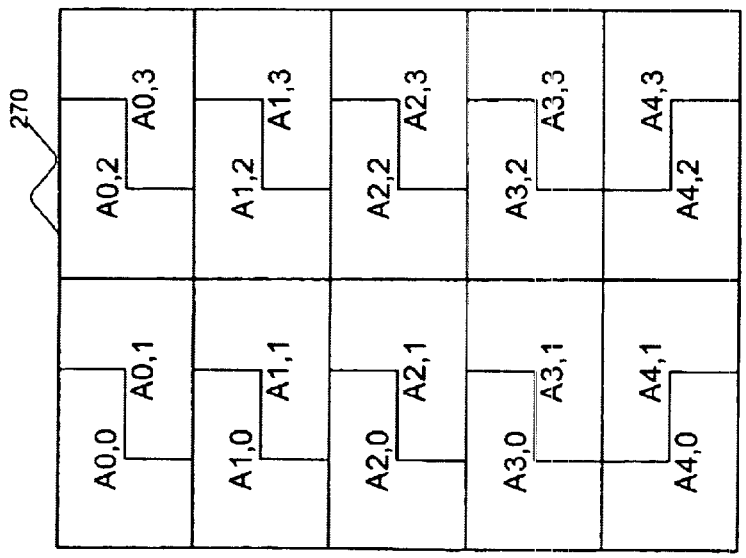
FIG. 23 shows a superblock tiling for a reduced horizontal resolution image.

As a final example, FIG. 23 illustrates a tiling 270 for a reduced horizontal resolution image (192×240 pixels). The corresponding mapping 280 of FIG. 24, including padding, illustrates how the invention can be applied to other image sizes.

Some choices of parameters and frame size may result in a non-integer number of video segments required for image mapping, i.e., some blank macroblocks resident in the "valid" video segments, and resulting compression inefficiency in the output. These parameter choices fall within the scope of the invention, as long as valid video segments are substantially filled, i.e., on the average contain about 75% valid data or more.

Figure 25:
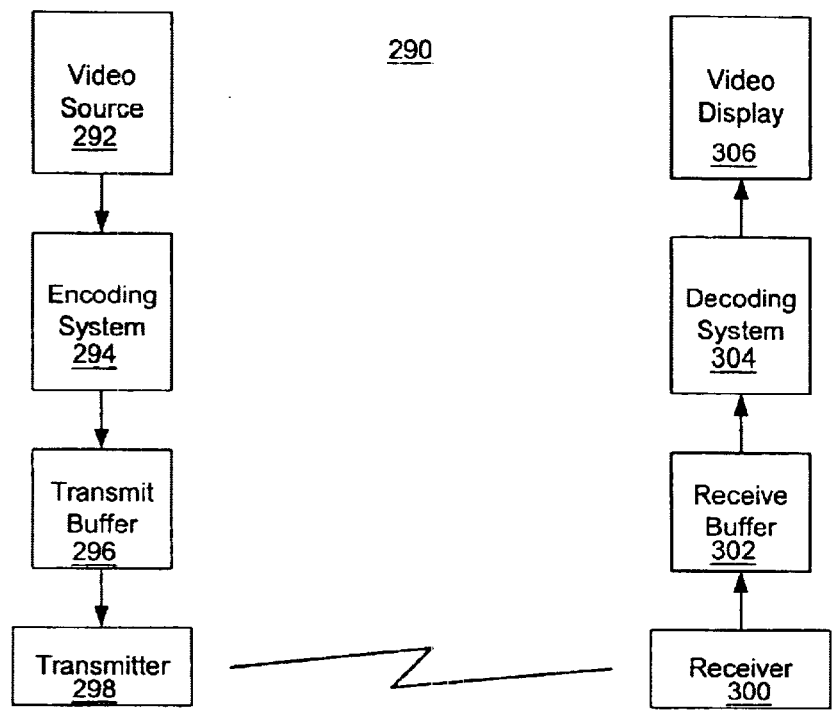
FIG. 25 shows a video transmit/display system using an embodiment of the invention.

FIG. 25 shows a transmit/receive system 290 using an embodiment of the invention. A video source 292 (e.g., a digital image capture device, tape reader, video broadcast tuner, etc.) supplies data to an encoding system 294 according to an encoding embodiment of the invention. Encoding system 294 outputs video segments corresponding to a selected format to transmit buffer 296. Transmitter 298 reads video segments from buffer 296 and relays them to a receiver 300 using a suitable relay method (optical, radio frequency, twisted pair or coax cable, etc.) and format (the transmission channel could be dedicated to system 290, or shared as in a time-multiplexed or packet-based channel). Receiver 300 supplies the transmitted video segments to a receive buffer 302. Decoding system 304, according to a decoding embodiment of the invention, reads video segments from receive buffer 302 and produces video frame output form video display 306.

System 290 has several benefits. It allows use of off-the-shelf DVC coders, decreasing system cost. By using a format such as QVGA, data rate can be held to a reasonable range. But data rate can also be traded for image quality, by allowing the encoder and decoder to communicate using various numbers of video segments per frame and the same DVC coders.

Figure 26:
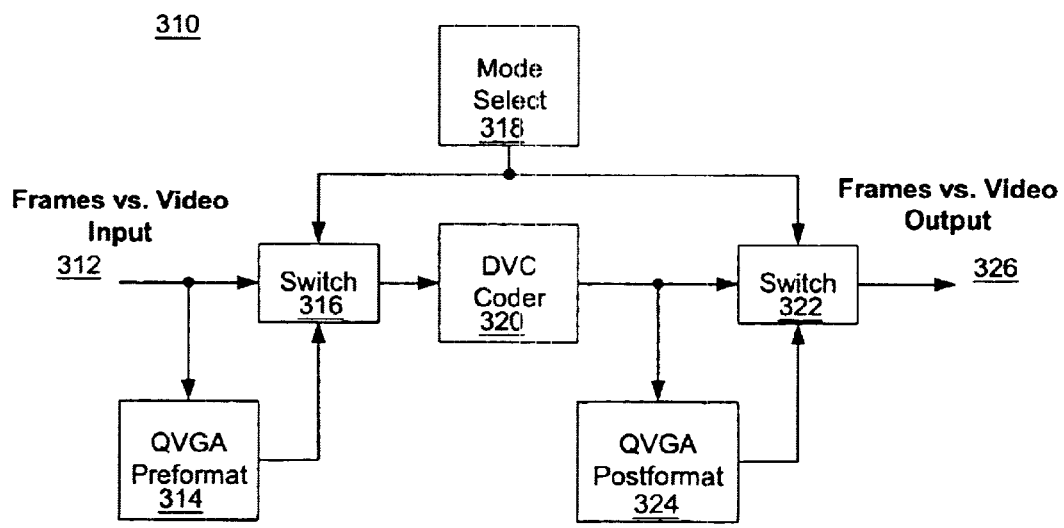
FIG. 26 illustrates a multi-mode DVC coding system according to an embodiment of the invention.

This last benefit is illustrated in encoding system 310 of FIG. 26. Encoding system 310 has a mode select capability 318. Mode select capability 318 may be a user setting, or can be automatically adaptable to an achievable data rate under given transmit conditions. Mode select capability 318 controls two switches 316 and 322, and may also provide input to DVC coder 320 and/or QVGA preformat 314/postformat 324 (inputs not shown). Video frame input 312 is provided to switch 316 and to QVGA preformat 314. Switch 316 is configured to provide either video frame input 312 (for full-frame DVC conversion) or the output of QVGA preformat 314 (for subframe DVC conversion) to DVC coder 320. DVC coder 320 provides video segments to switch 322 and QVGA postformat 324. Switch 322 provides a video segment output 326 that is either the full output of DVC coder 320, or selected video segments as output by QVGA postformat 324. Note that QVGA pre- and post-formatters may have other possible resolutions selectable by mode select 318, such as the reduced horizontal resolution of FIG. 23.

With encoding system 310, common-format video segments can be produced efficiently at several data rates. The current data rate can be selected to match the characteristics of a particular transmission channel. Or, video resolution can be traded for record time if video is being recorded to storage media. Note that a corresponding decoding system, although not shown, can be similarly configured.

One of ordinary skill in the art will recognize that the concepts taught herein can be tailored to a particular application in many advantageous ways. Special-purpose hardware, software running on a digital signal processor or general purpose microprocessor, or some combination of these elements can be used to construct an encoding system or a decoding system according to embodiments of the invention. The particular superblock size or shape selected for a subimage is not critical, as long as it allows efficient distribution of the subimage amongst DVC video segments—indeed, superblock size can be as small as a DVC macroblock. If a system has a full-DVC and a sub-image mode, one of the DVC frame buffers needed for full-DVC mode can be utilized for other buffers in subimage mode. Input to the DVC coder may be in raster form, by passing a pointer to a block of frame data, or other common methods. Such minor modifications are encompassed within the invention, and are intended to fall within the scope of the claims.

What is claimed is:

1. A method for transmitting a digital video sequence using a digital video coder that encodes a digital video frame using video segments, each video segment representing data from multiple scattered regions of a digital video frame presented to the digital video coder, the method comprising:

segmenting an original frame of the digital video sequence into a set of blocks;

presenting the blocks to the digital video coder as part of a larger, synthesized digital video frame, the blocks inserted into the digital video frame so as to substantially occupy frame locations corresponding to selected video segments in the video segment encoding order of the digital video coder;

encoding the synthesized digital video frame with the digital video coder, thereby producing a coded output stream comprising multiple video segments;

selecting, from the coded output stream, those video segments corresponding to the digital image;

transmitting the selected video segments to a receiver;

inserting the selected video segments into a coded input stream;

presenting the coded input stream to a digital video decoder for decoding into a second synthesized digital video frame; and selecting, from the second synthesized digital video frame, reconstructed blocks corresponding to the set of blocks of the original frame of the digital video sequence; and combining the reconstructed blocks to form an output digital video frame corresponding to the original frame.

2. The method of claim 1, wherein the set of blocks are presented to the digital video encoder substantially in the order received, by placing them substantially in that order into the frame locations corresponding to selected video segments substantially in the order that the selected video segments are presented to the encoder.

3. The method of claim 1, further comprising padding the set of blocks in the synthesized digital video frame by copying data from the original frame to frame locations adjacent the frame locations of the blocks in the synthesized digital video frame.

4. The method of claim 1, further comprising:

presenting each original frame of the digital video sequence to the digital video coder for two consecutive frame times, with a following frame presented in a different set of frame locations than the frame locations selected for the preceding frame.

* * * * *